(12) United States Patent
Ganesh

(10) Patent No.: US 12,145,813 B2
(45) Date of Patent: Nov. 19, 2024

(54) LOGISTICS OPERATION ENVIRONMENT MAPPING FOR AUTONOMOUS VEHICLES

(71) Applicant: United Parcel Service of America, Inc., Atlanta, GA (US)

(72) Inventor: Bala Ganesh, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 781 days.

(21) Appl. No.: 16/506,631

(22) Filed: Jul. 9, 2019

(65) Prior Publication Data

US 2021/0009365 A1  Jan. 14, 2021

(51) Int. Cl.
| | |
|---|---|
| *B60P 3/00* | (2006.01) |
| *B65G 67/04* | (2006.01) |
| *G01C 21/26* | (2006.01) |
| *G05D 1/00* | (2006.01) |

(52) U.S. Cl.
CPC ............. *B65G 67/04* (2013.01); *B60P 3/00* (2013.01); *G01C 21/26* (2013.01); *G05D 1/02* (2013.01)

(58) Field of Classification Search
CPC .......... B60P 3/00; B65G 67/00; B65G 67/02; B65G 67/04; G01C 21/00; G01C 21/26; G05D 1/00; G05D 1/02; G06Q 10/083; B64D 1/22; B64C 39/024; B64C 27/08; B64C 2201/024; B64C 2201/128; B64C 2201/108; G06V 20/54; G06V 20/56; G06V 20/58–588; G08G 1/161
See application file for complete search history.

(56) References Cited

U.S. PATENT DOCUMENTS

| | | | | |
|---|---|---|---|---|
| 9,658,620 | B1 * | 5/2017 | Urmson | ............. G06Q 30/0207 |
| 2017/0313421 | A1 * | 11/2017 | Gil | ..................... G06Q 10/0832 |
| 2019/0102874 | A1 | 4/2019 | Goja | |

OTHER PUBLICATIONS

Kumar Chellapilla, Rethinking Maps for Self-Driving, Oct. 15, 2018, Woven Planet Level 5, https://medium.com/wovenplanetlevel5/https-medium-com-lyftlevel5-rethinking-maps-for-self-driving-a147c24758d6 (Year: 2018).*
International Search Report and Written Opinion received for PCT Patent Application No. PCT/US2020/041368, mailed on Oct. 30, 2020, 11 pages.

* cited by examiner

*Primary Examiner* — Tiffany P Young
(74) *Attorney, Agent, or Firm* — Shook, Hardy & Bacon L.L.P.

(57) ABSTRACT

An indication that one or more physical objects have been detected in a first geographical environment is received via one or more sensors. The one or more sensors are coupled to a logistics vehicle as the logistics vehicle performs one or more shipping operations. Based at least in part on the receiving of the indication that one or more physical objects have been detected, a mapping of the first geographical environment is caused to be generated. The mapping includes at least an image representation of the first geographical environment associated with the first geographical environment. The mapping is stored. The stored mapping is for use by an autonomous vehicle or partially autonomous vehicle for detecting objects in the first geographical environment.

19 Claims, 9 Drawing Sheets

| MAPPED LOCATIONS — 701 | UNMAPPED LOCATIONS — 703 |
|---|---|
| HARRISONVILLE | MESA |
| GEOFENCE 56279 | GEOFENCE XT345 |
| DEXTER | FAIR STREET |
| ... | ... |

705 ☑ SEND NOTIFICATION TO LOGISTICS VEHICLES/DEVICES?

707 ☑ SEND NOTIFICATION OR MAPPINGS TO DEPLOYED AVS/DEVICES?

LOGISTICS OPERATION ENVIRONMENT MAPPING FOR AUTONOMOUS VEHICLES

BACKGROUND

In recent years, autonomous vehicles ("AV") (e.g., "self-driving cars") have generated significant attention and discussion. AVs are expected to play a major role in transforming society's transportation systems in coming years. A fully autonomous vehicle can operate without human control and does not require human intervention. These vehicles can sense their local environment, classify different kinds of objects that they detect, and interpret sensory information to identify appropriate navigation paths all while conforming to transportation rules. Successfully performing these actions requires combining a variety of technologies from different disciplines, such as computer science, mechanical engineering, electronics engineering, and control engineering.

There are several expected benefits of AV technology, as well as some challenges. For example, some expected benefits include safer vehicle operation and improved efficiency of traffic flow compared to human-controlled vehicles. Some existing challenges with AV technology are that AVs typically require a considerable amount of resource consumption and time before they can be deployed in any particular area, and the mapping functionality of environments associated with object detection is limited.

SUMMARY

Various embodiments of the present disclosure are directed to a computer-implemented method, a system, and an apparatus. In some aspects, the computer-implemented method includes the following operations. A first set of one or more physical objects are detected, via a first sensor, in a first geographical environment as a first logistics vehicle performs a first shipping operation. The first sensor is coupled to the first logistics vehicle. A second set of one or more physical objects are detected, via a second sensor, in a second geographical environment as a second logistics vehicle performs a second shipping operation. The second sensor is coupled to the second logistics vehicle. Based at least in part the detecting of the first set of one or more physical objects and the second set of one or more physical objects, a mapping that includes an image representing the first geographical environment and the second geographical environment is generated. The mapping is stored to a data store. The stored mapping is configured to be used by an autonomous vehicle or partially autonomous vehicle for object detection.

In some aspects, the system includes at least one computing device having at least one processor and at least one computer readable storage medium having program instructions embodied therewith. The program instructions are readable or executable by the at least one processor to cause the system to perform the following operations in some aspects. In response to a logistics vehicle performing one or more shipping operations in a first geographical environment, an indication that one or more physical objects have been detected in the first geographical environment are received, via one or more sensors. The one or more sensors are coupled to the logistics vehicle. Information indicative of one or more transportation rules associated with traversing the first geographical environment is obtained. Based at least in part on the receiving of the indication that one or more physical objects have been detected and the information indicative of one or more transportation rules, a mapping of the first geographical environment is generated. A mapping is stored. The stored mapping is for use by an autonomous vehicle or partially autonomous vehicle that traverses the first geographical area.

In some aspects, the apparatus comprises a computer readable storage medium having program instructions embodied therewith. The program instructions are executable by one or more processors to cause the one or more processors to perform the following operations in some aspects. In response to a logistics vehicle performing one or more shipping operations in a first geographical environment, an indication that one or more physical objects have been detected in the first geographical environment is received via one or more sensors. The one or more sensors are coupled to the logistics vehicle. Based at least in part on the receiving of the indication that one or more physical objects have been detected, a mapping of the first geographical environment is caused to be generated. The mapping includes an image representation of the first geographical environment and metadata associated with the first geographical environment. The mapping is stored. The stored mapping is for use by an autonomous vehicle or partially autonomous vehicle for detecting objects in the first geographical environment.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. In various embodiments, any functionality can be added or removed from the computer-implemented method, the system, and the apparatus described above, such as functionality described with respect to the flow diagrams of FIG. 8.

BRIEF DESCRIPTION OF THE DRAWINGS

Figure 1:
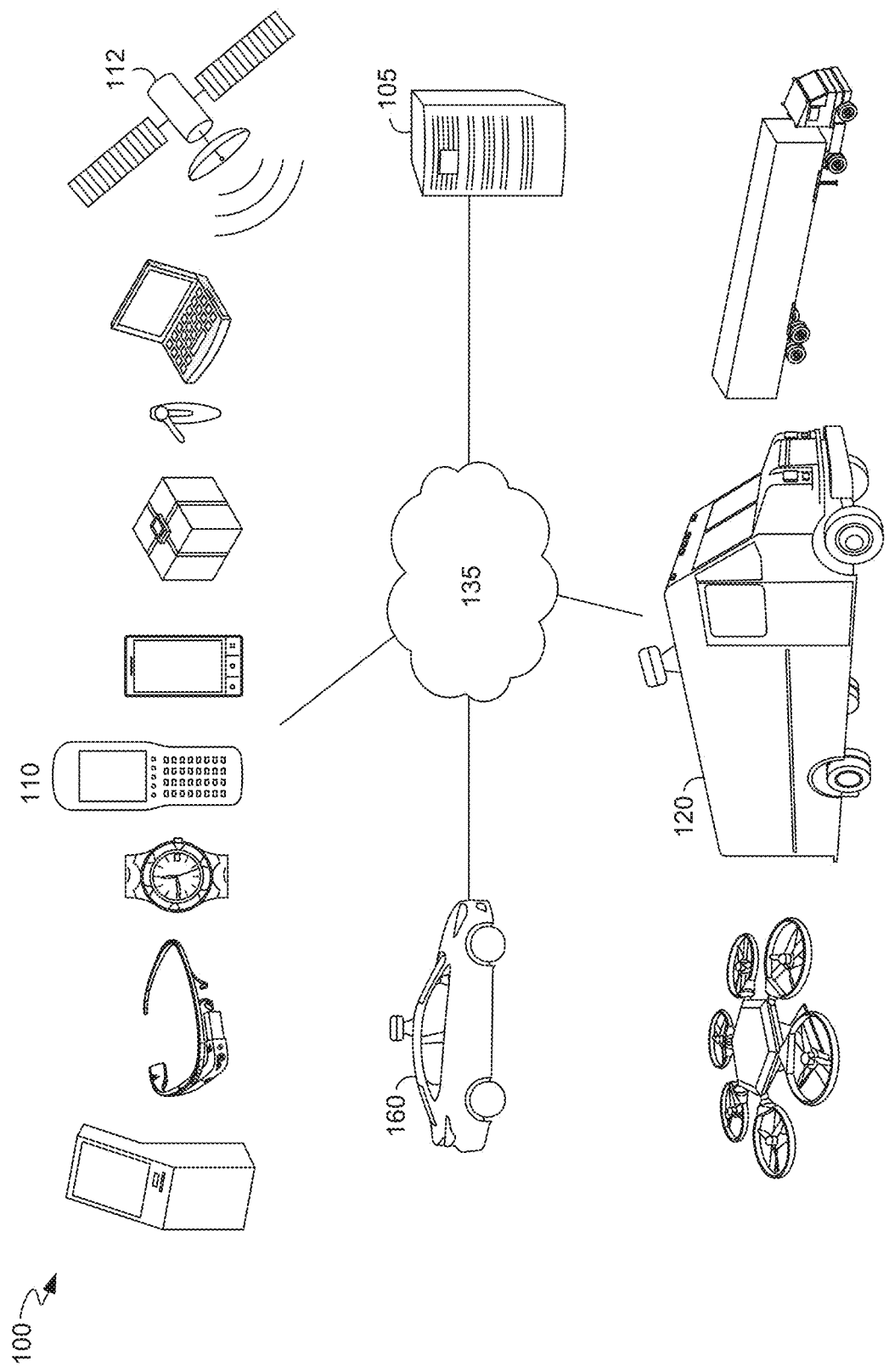

Having thus described the disclosure in general terms, reference will now be made to the accompanying drawings, which are not necessarily drawn to scale, and wherein:

FIG. 1 is a schematic diagram of an example computing environment in which aspects of the present disclosure are employed in, according to some embodiments.

Figure 2:
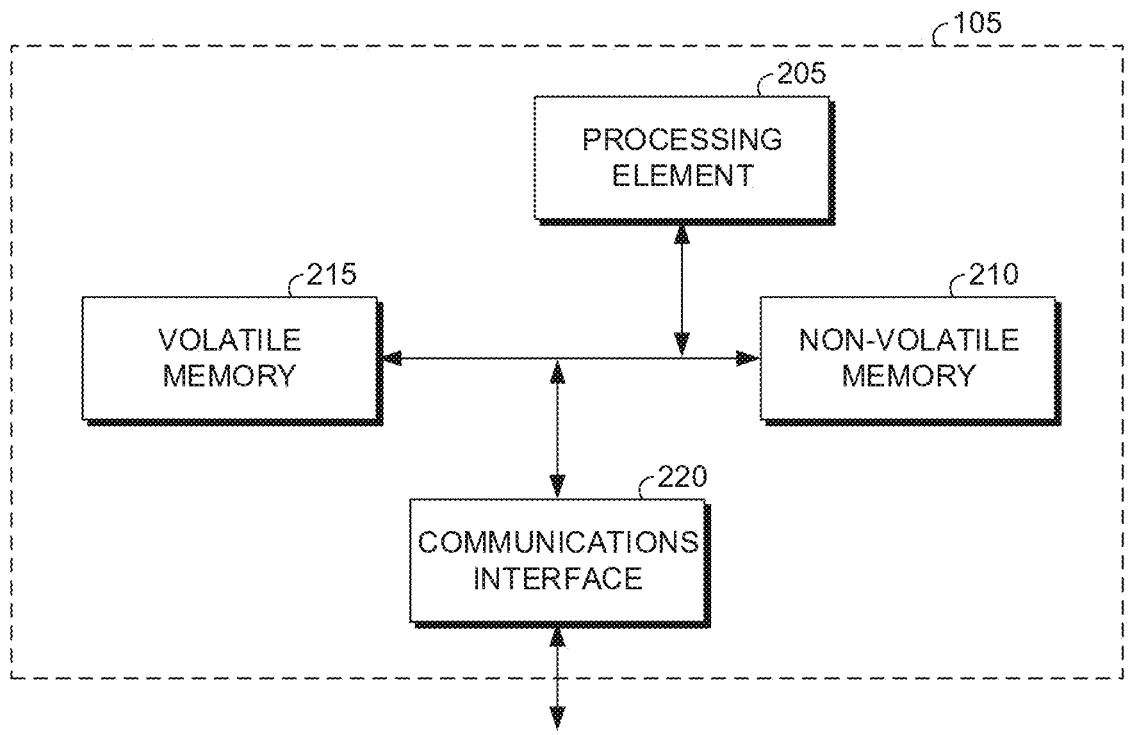

FIG. 2 is a schematic diagram of an analysis computing entity in which aspects of the present disclosure are employed in, according to some embodiments.

Figure 3:
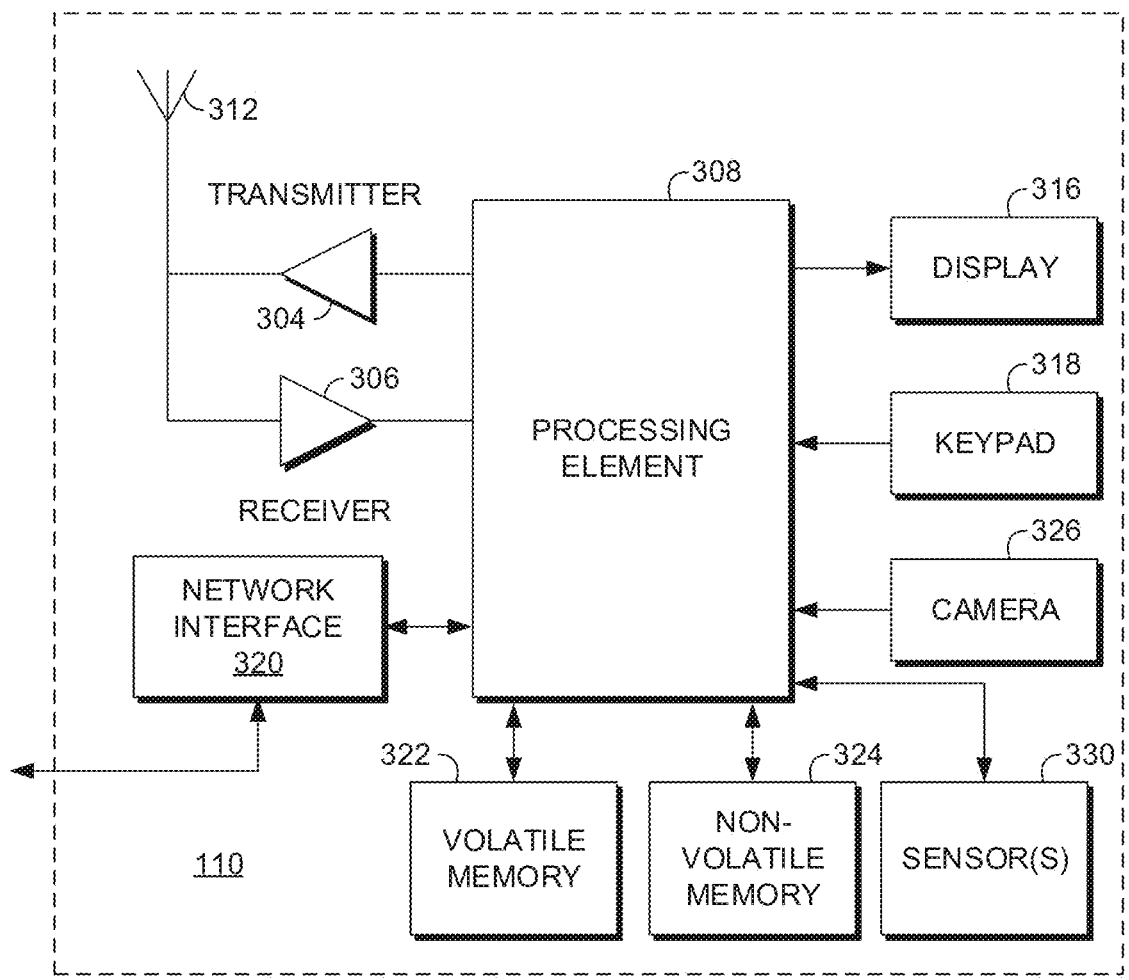

FIG. 3 is a schematic diagram of a computing entity in which aspects of the present disclosure are employed in, according to some embodiments.

Figure 4:
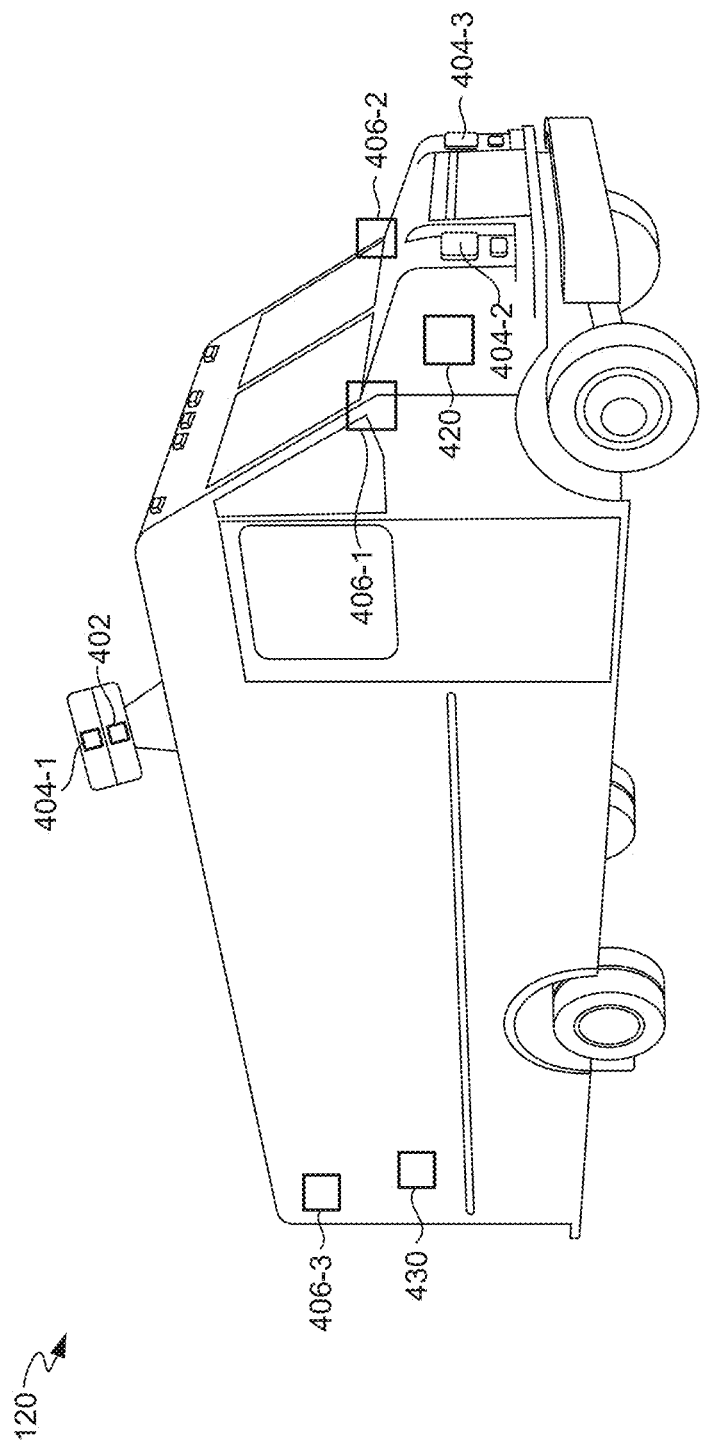

FIG. 4 is a block diagram of the logistics vehicle of FIG. 1, according to some embodiments.

Figure 5A:
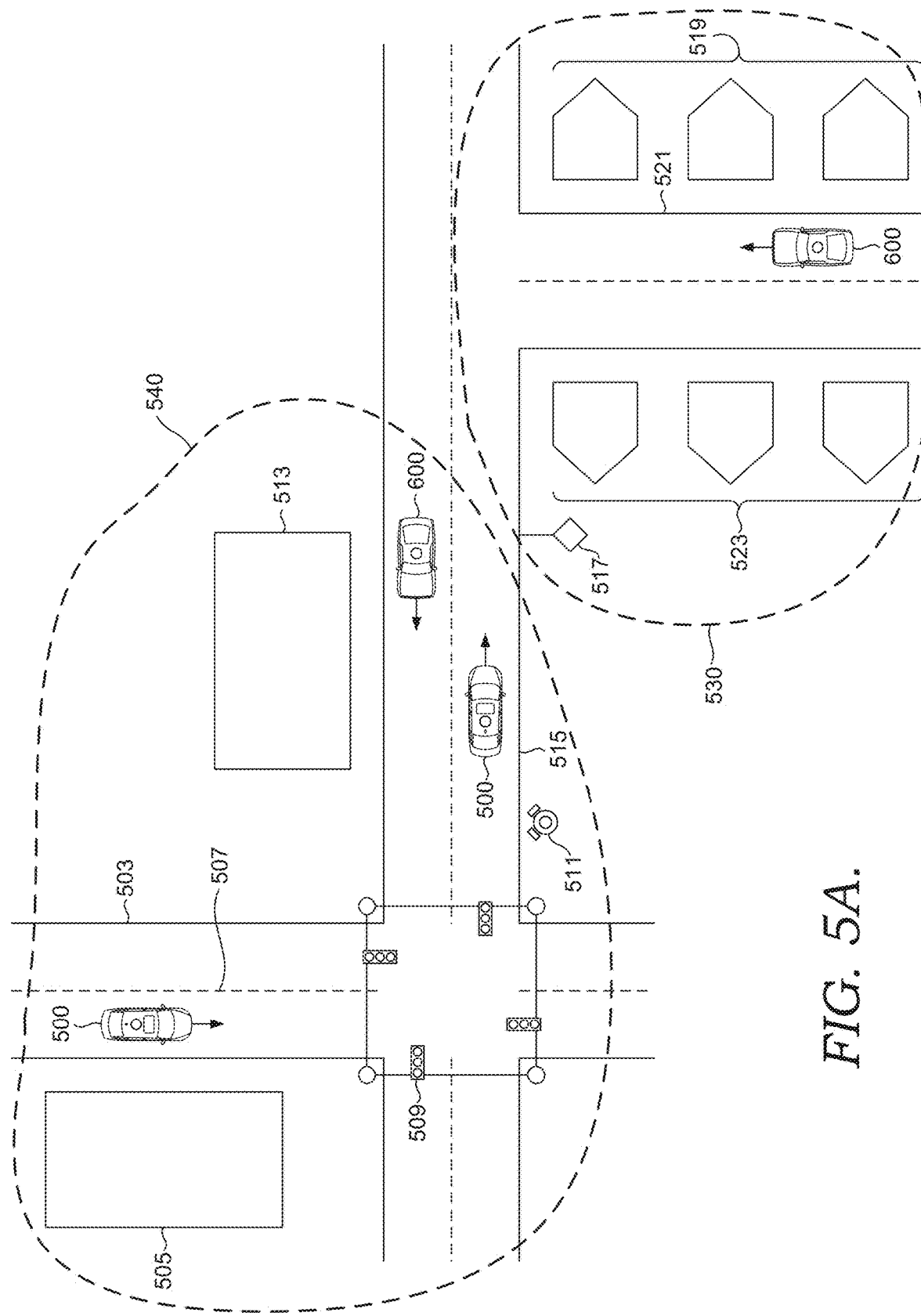

FIG. 5A is a schematic diagram of multiple geographic environments that are used for generating a mapping, according to some embodiments.

Figure 5B:
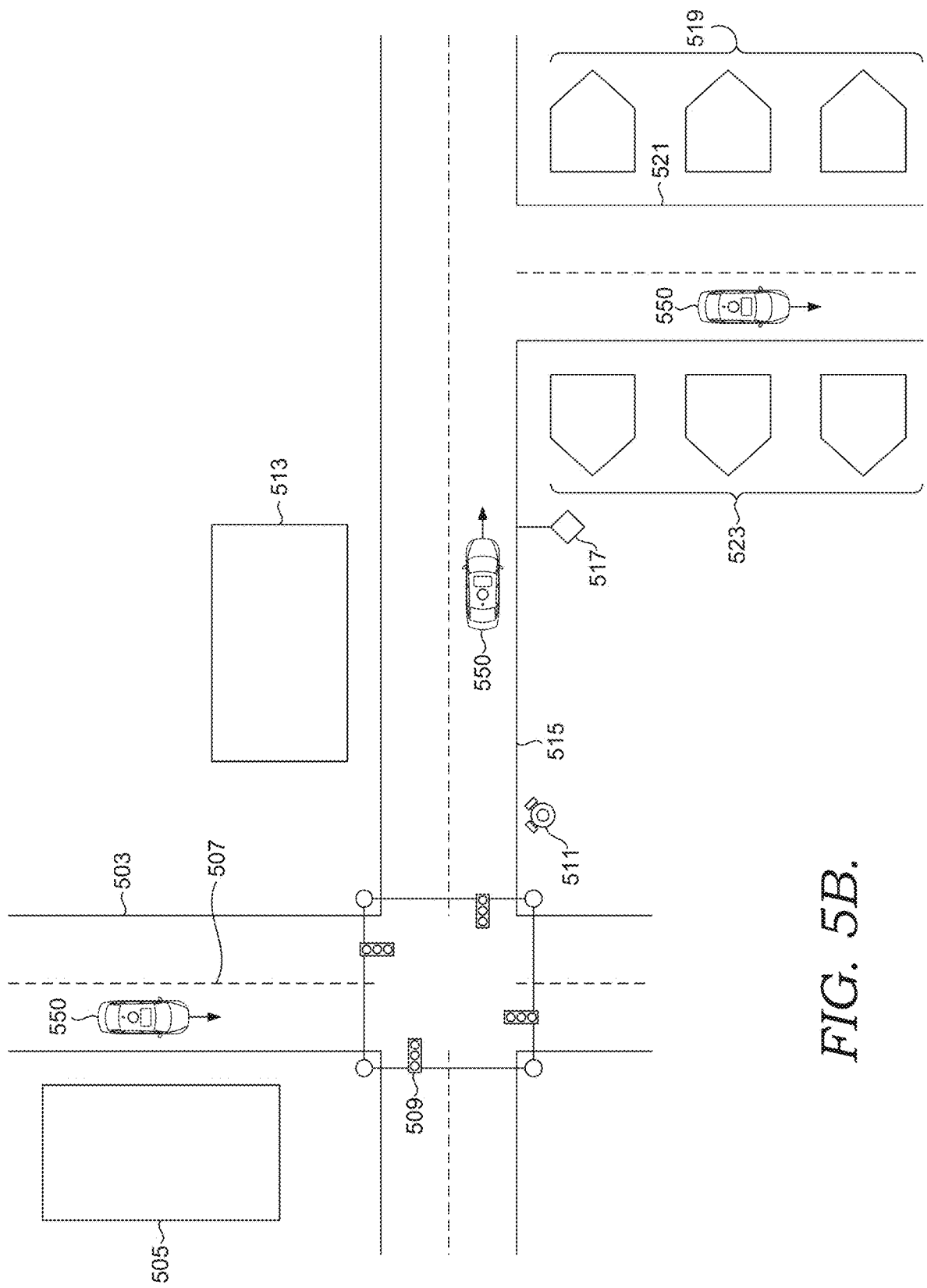

FIG. 5B is a schematic diagram of an autonomous or partially autonomous vehicle that traverses the same geographical environments of FIG. 5A and detects or identified objects based at least in part on the mapping that occurred at FIG. 5A, according to some embodiments.

Figure 6:
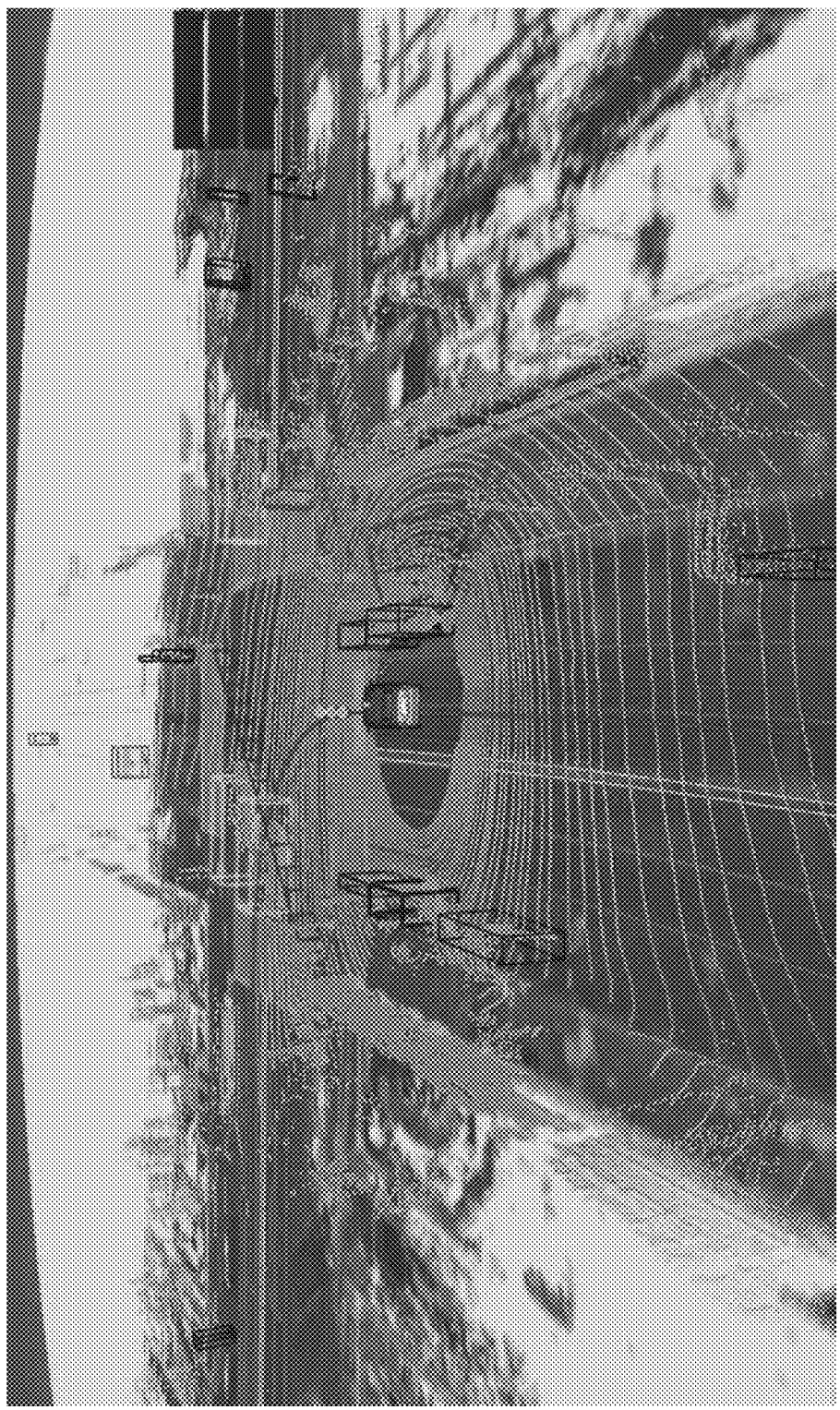

FIG. 6 illustrates an image of a generated mapping, according to some embodiments.

FIG. 7 is a screenshot of a user interface indicating notification options and which geographical environments have been mapped, according to some embodiments.

Figure 8:
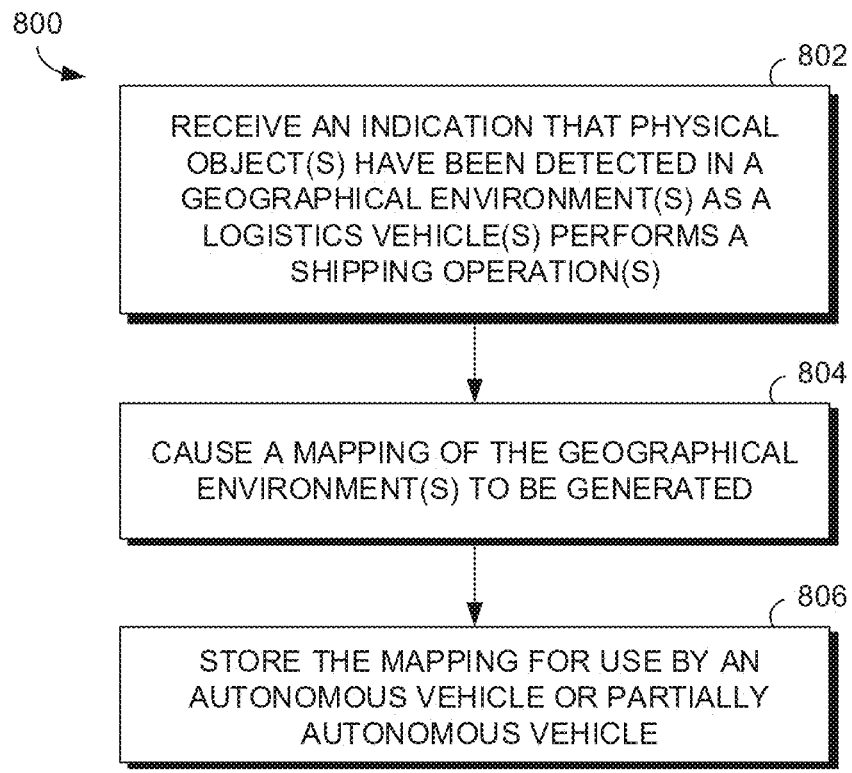

FIG. 8 is a flow diagram of an example process for generating a mapping, according to me some embodiments.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. Overview

As described above, existing AV technology currently requires a significant amount of resource consumption and time, among other things, before these vehicles are deployed in a given environment. AV companies spend considerable time (e.g., 3 to 6 months) and millions of dollars to map out specific geographical areas (e.g., a 10 mile radius) before they can start deploying AVs in these geographical areas. Mapping functionality is important for AV technology because these maps are often used as a baseline or safety net if sensors malfunction or are unable to otherwise adequately detect objects in real-time (e.g., because of weather). In this way, the AV has a better sense of when to make stops, turn, etc. for a given route regardless of the real-time surroundings. This mapping may require equipping vehicles with sensors that have to drive on all the relevant roads multiple times to map out the roads and other objects before commencing AV operations. In some instances, the AVs themselves (with drivers inside) perform these mapping operations and then they are deployed without drivers at a later time.

With limited resources, such as mapping vehicles, AVs have sparse mapping functionality for any given geographical environment that the AVs will traverse. Consequently, AVs are often limited to traversing only small geographical environments with a high degree of confidence. This can lead to grave consequences because if the sensors of a deployed AV are unable to adequately detect objects in an environment (e.g., because of bad weather) and happens to be in a geographical environment that has not been mapped before deployment, then the AV may not be able to detect an object or environment feature (e.g., a stop light), leading to catastrophic consequences. Moreover, computing resource consumption, such as sensor or vehicle usage is unnecessarily consumed. For example, before an AV is deployed, a vehicle equipped with a computer vision camera may map out several roads and other objects in various environments while traveling hundreds of miles. This can cause wear and tear on the sensors and over utilization of vehicles.

Various embodiments of the present disclosure improve these existing AV technologies by providing one or more solutions to the problems described above. For example, a first set of one or more physical objects can be detected by a first sensor in a first geographical environment as a first logistics vehicle (e.g., a carrier delivery vehicle) performs a first shipping operation (e.g., a delivery of packages to a destination address). The first sensor can be coupled to the first logistics vehicle. Based at least in part on the set of one or more physical objects being detected, a mapping of the first geographical environment can be generated. For example, a combination of a radar and lidar sensor can be used to generate a 3D map of an environment while the first logistics vehicle traverses the first geographical environment. The mapping may include an image representation of the first geographical environment and other data (e.g., metadata) associated with the first geographical environment. This mapping can then be stored for use by a deployed autonomous vehicle or partially autonomous vehicle for detecting objects in the first geographical environment.

By equipping logistics vehicles with these specific mapping capabilities while they are performing normal logistics operations, AV technologies will be able to better detect objects, especially in adverse conditions. There is a high quantity of logistics vehicles, each of these vehicles travel greater distances and to more areas, and there are greater mapping functionality capabilities compared to mapping vehicles in existing AV technologies. Consequently, fuller and more data rich maps may be used by AVs leading to a less likelihood of catastrophic consequences because the AV will have a higher chance of detecting objects in more environments regardless of environment factors, such as bad weather. Moreover, there is not as much unnecessary wear and tear on AV or other vehicles and sensors, as these logistics vehicles are performing the mapping and performing necessary additional logistics tasks during the mapping.

II. Apparatuses, Methods, and Systems

Embodiments of the present disclosure may be implemented in various ways, including as apparatuses that comprise articles of manufacture. An apparatus may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 is a schematic diagram of an example computing environment 100 in which aspects of the present disclosure are employed in, according to some embodiments. As shown in FIG. 1, this particular computing environment 100 includes one or more logistics vehicles 120, one or more analysis computing entities 105, one or more computing entities 110 (e.g., a mobile device, such as a DIAD), one or more satellites 112, one or more networks 135, and/or the like. Each of these components, entities, devices, systems, and similar words used herein interchangeably may be in direct or indirect communication with, for example, one another over the same or different wired and/or wireless networks. Additionally, while FIG. 1 illustrates the various system entities as separate, standalone entities, the various embodiments are not limited to this particular architecture.

In various embodiments, the network(s) 135 represents or includes an IoT network, which is a network of interconnected items that are each provided with unique identifiers (e.g., UIDs) and computing logic so as to communicate or transfer data with each other or other components. Such communication can happen without requiring human-to-human or human-to-computer interaction. For example, a IoT network may include the logistics vehicle 120, which is equipped with one or more sensors and transmitter in order to process and/or transmit sensor data over the network 135 to the analysis computing entity(s) 105. In the context of an IoT network, a computer (not shown) within the logistics vehicle 120 can be or include one or more local processing devices (e.g., edge nodes) that are one or more computing devices configured to store and process, over the network(s) 135, either a subset or all of the received or respective sets of data to the one or more remote computing devices (e.g., the computing entities 110 and/or the analysis computing entity(s) 105) for analysis.

In some embodiments, the local processing device(s) is a mesh or other network of microdata centers or edge nodes that process and store local data received from sensors coupled to the logistics vehicle 120 and push or transmit some or all of the data to a cloud device or a corporate data center that is or is included in the one or more analysis computing entities 105. In some embodiments, the local processing device(s) store all of the data and only transmit selected (e.g., data that meets a threshold) or important data to the one or more analysis computing entities 105. Accordingly, the non-important data or the data that is in a group that does not meet a threshold is not transmitted. For example, a lidar, radar, and/or camera sensor located within the logistics vehicle 120 may sample map data but only push a portion of the map data. Accordingly, only after the condition or threshold has been met, do the local processing device(s) transmit the data that meets or exceeds the threshold to remote computing devices such that the remote device(s) can take responsive actions, such as notify a user mobile device (e.g., computing entity 110) indicating the threshold has been met and/or cause a modification of a device (e.g., an AV to perform an action (e.g., turn) based on the control signal received). The data that does not meet or exceed the threshold is not transmitted in particular embodiments. In various embodiments where the threshold or condition is not met, daily or other time period reports are periodically generated and transmitted from the local processing device(s) to the remote device(s) indicating all the data readings gathered and processed at the local processing device(s). In some embodiments, the one or more local processing devices act as a buffer or gateway between the network(s) and a broader network, such as the one or more networks 135. Accordingly, in these embodiments, the one or more local processing devices can be associated with one or more gateway devices that translate proprietary communication protocols into other protocols, such as internet protocols.

The AV 160 represents an autonomous vehicle or partially autonomous vehicle. In some embodiments, this represents another logistics vehicle that performs one or more shipping operations autonomously or partially autonomously. In some embodiments, the AV 160 represents a third party AV such that it is not affiliated with a logistics vehicle other than obtaining mapping data obtained from the logistics vehicle 120, as described in more detail herein. The AV 160 may be any suitable AV, such as a car, truck, an aircraft, a drone that travels in air space, etc.

1. Exemplary Analysis Computing Entities

FIG. 2 provides a schematic of an analysis computing entity 105 according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the analysis computing entity 105 may also include one or more communications interfaces 220 for communicating with various computing entities, such as by communicating data, content, information/data, and/or similar terms used herein interchangeably that can be transmitted, received, operated on, processed, displayed, stored, and/or the like.

As shown in FIG. 2, in particular embodiments, the analysis computing entity 105 may include or be in communication with one or more processing elements 205 (also referred to as processors, processing circuitry, and/or similar terms used herein interchangeably) that communicate with other elements within the analysis computing entity 105 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In particular embodiments, the analysis computing entity 105 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the analysis computing entity 105 may further include or be in communication with volatile media (also referred to as volatile storage, memory, memory storage, memory circuitry and/or similar terms used herein interchangeably). In particular embodiments, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the analysis computing entity 105 with the assistance of the processing element 205 and operating system.

As indicated, in particular embodiments, the analysis computing entity 105 may also include one or more communications interfaces 220 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the analysis computing entity 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the analysis computing entity 105 may include or be in communication with one or more input elements, such as a keyboard input, a mouse input, a touch screen/display input, motion input, movement input, audio input, pointing device input, joystick input, keypad input, and/or the like. The analysis computing entity 105 may also include or be in communication with one or more output elements (not shown), such as audio output, video output, screen/display output, motion output, movement output, and/or the like.

As will be appreciated, one or more of the analysis computing entity's 105 components may be located remotely from other analysis computing entity 105 components, such as in a distributed system. Additionally or alternatively, the analysis computing entity 105 may be represented among a plurality of analysis computing entities. For example, the analysis computing entity 105 can be or be included in a cloud computing environment, which includes a network-based, distributed/data processing system that provides one or more cloud computing services. Further, a cloud computing environment can include many computers, hundreds or thousands of them or more, disposed within one or more data centers and configured to share resources over the network(s) 135. Furthermore, one or more of the components may be combined and additional components performing functions described herein may be included in the analysis computing entity 105. Thus, the analysis computing entity 105 can be adapted to accommodate a variety of needs and circumstances. As will be recognized, these architectures and descriptions are provided for exemplary purposes only and are not limiting to the various embodiments.

2. Exemplary Computing Entities

Computing entities 110 may be configured for registering one or more users, processing one or more shipping requests, securing parcels, monitoring shipments, and/or for operation by a user (e.g., a vehicle operator, delivery personnel, customer, and/or the like). In certain embodiments, computing entities 110 may be embodied as handheld computing entities, such as mobile phones, tablets, personal digital assistants, and/or the like, that may be operated at least in part based on user input received from a user via an input mechanism. Moreover, computing entities 110 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, computing entities 110 may be utilized as onboard controllers for UAVs configured for picking-up and/or delivering packages to various locations, and accordingly such computing entities 110 may be configured to monitor various inputs (e.g., from various sensors) and generated various outputs. It should be understood that various embodiments of the present disclosure may comprise a plurality of computing entities 110 embodied in one or more forms (e.g., parcel security devices kiosks, mobile devices, watches, laptops, carrier personnel devices (e.g., Delivery Information Acquisition Devices (DIAD)), etc.)

As will be recognized, a user may be an individual, a family, a company, an organization, an entity, a department within an organization, a representative of an organization and/or person, and/or the like—whether or not associated with a carrier. In particular embodiments, a user may operate a computing entity 110 that may include one or more components that are functionally similar to those of the analysis computing entity 105. FIG. 3 provides an illustrative schematic representative of a computing entity 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Computing entities 110 can be operated by various parties, including carrier personnel (sorters, loaders, delivery drivers, network administrators, and/or the like). As shown in FIG. 3, the computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively. In some embodiments, the computing entity 110 includes one or more sensors 330. In this way, the computing entity 110 is a special-purpose computer or particular machine that is configured to specifically provide security for parcels. In some embodiments, at least one of the computing entities 110 is coupled to the logistics vehicle 120 (e.g., within the trunk). The one or more sensors 330 can be one or more of: a pressure sensor, an accelerometer, a gyroscope, a geolocation sensor (e.g., GPS sensor), a radar, a lidar, sonar, ultrasound, an object recognition camera, and any other suitable sensor used to detect objects in a geographical environment.

The signals provided to and received from the transmitter 304 and the receiver 306, respectively, may include signaling information in accordance with air interface standards of applicable wireless systems. In this regard, the computing entity 110 may be capable of operating with one or more air interface standards, communication protocols, modulation types, and access types. More particularly, the computing entity 110 may operate in accordance with any of a number of wireless communication standards and protocols, such as those described above with regard to the analysis computing entity 105. In a particular embodiment, the computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing entity 110 may operate in accordance with multiple wired communication standards and protocols, such as those described above with regard to the analysis computing entity 105 via a network interface 320.

Via these communication standards and protocols, the computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 110 can also download changes, add-ons, and updates, for instance, to its firmware, software (e.g., including executable instructions, applications, program modules), and operating system.

According to particular embodiments, the computing entity 110 may include location determining aspects, devices, modules, functionalities, and/or similar words used herein interchangeably. For example, the computing entity 110 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 110 position in connection with a variety of other systems, including cellular towers, Wi-Fi access points, and/or the like. Similarly, the computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the computing entity 110 to interact with and/or cause display of information from the analysis computing entity 105, as described herein. The user input interface can comprise any of a number of devices or interfaces allowing the computing entity 110 to receive information/data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in FIG. 3, the computing entity 110 may also include an camera, imaging device, and/or similar words used herein interchangeably 326 (e.g., still-image camera, video camera, IoT enabled camera, IoT module with a low resolution camera, a wireless enabled MCU, and/or the like) configured to capture images. The computing entity 110 may be configured to capture images via the onboard camera 326, and to store those imaging devices/cameras locally, such as in the volatile memory 322 and/or non-volatile memory 324. As discussed herein, the computing entity 110 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 326. The contextual data may be stored as a portion of the image (such that a visual representation of the image data includes the contextual data) and/or may be stored as metadata (e.g., data that describes other data, such as describing a payload) associated with the image data that may be accessible to various computing entities 110.

The computing entity 110 may include other input mechanisms, such as scanners (e.g., barcode scanners), microphones, accelerometers, RFID readers, and/or the like configured to capture and store various information types for the computing entity 110. For example, a scanner may be used to capture parcel/item/shipment information/data from an item indicator disposed on a surface of a shipment or other item. In certain embodiments, the computing entity 110 may be configured to associate any captured input information/data, for example, via the onboard processing element 308. For example, scan data captured via a scanner may be associated with image data captured via the camera 326 such that the scan data is provided as contextual data associated with the image data.

The computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the computing entity 110. As indicated, this may include a user application that is resident on the entity or accessible through a browser or other user interface for communicating with the analysis computing entity 105 and/or various other computing entities.

In another embodiment, the computing entity 110 may include one or more components or functionality that are the same or similar to those of the analysis computing entity 105, as described in greater detail above. As will be recognized, these architectures and descriptions are provided for exemplary purposes only and are not limiting to the various embodiments.

3. Exemplary logistics vehicle

FIG. 4 is a block diagram of the logistics vehicle 120 of FIG. 1, according to some embodiments. Although the logistics vehicle 120 is represented as a specific vehicle with specific sensors, it is understood that any suitable vehicle and/or sensor may exist. For example, in some embodiments, the logistics vehicle 120 is represented as a drone that travels in air space to unload parcels, an aircraft, a car, a boat, etc.

In various embodiments, the logistics vehicle 120 includes the lidar units 404-1, 404-2, 404-3, the radar units 406-1 406-2, 406-3, the telematics device 420, the camera(s) 402, and the computing device 430 (e.g., a computing entity 110), such as an edge node. The lidar (Light Detection and Ranging) units 404 are sensors that detect objects and build a map of a geographical environment based on transmitting a plurality of light pulses a second and measure how long it takes for those light pulses to bounce off of objects in the environment back to the sensor (e.g., 150,000 pulses per second). These lidar units, such as 404-1, can indefinitely spin transversely in a plane parallel to the ground capturing a 360-degree image of the logistics vehicle 120's surroundings. The output is a three-dimensional mapping of the geographical environment. These sensors can also calculate the distance between itself and the objects within the environment, as well as detecting exact sizes, colors, shapes of objects, and/or other metadata.

The radar units 406 are similar to the lidar units 404 in that they also transmit signals and measure how long these signals take to bounce off objects back to the sensor. However, these signals are radio waves, instead of light pulses (which are faster). These sensors detect road dynamics, such as detours, traffic delays, vehicle collisions, and other objects. Long range radar typically detects objects further away compared to lidar, which can be used for adaptive cruise control and the like. Whereas lidar typically detects objects that are less far away and is used for emergency braking, pedestrian detection, collision avoidance, etc.

The one or more cameras 402 utilize object recognition or computer vision algorithms to detect and classify objects on the road, such as lane lines and traffic signs. These cameras can provide images to the computing device 430 for determining depth of field, peripheral movement, and dimensionality of objects. In some embodiments, these cameras 402 use deep learning or other machine learning models and techniques for object classification. For example, in some embodiments, convolutional neural networks (CNN) are used to detect and classify objects, such as determining and classifying objects (e.g., car, person, traffic light, etc.). The one or more cameras 402 can be used for short-distance recognition, such park assistance, compared to other sensors, such as lidar.

The telematics device 420 is configured to control a variety of vehicle sensors, collect vehicle telematics data generated by sensors, and transmit the telematics data to the one or more analysis computing entities 105 and/or the computing entities 110 via one of several communication methods. In various embodiments, the logistics vehicle 120 is equipped with one or more vehicle sensors (e.g., the vehicle's engine speed sensor, speed sensor, seat belt status sensor, direction sensor, and location sensor). These sensors can detect one or more of the following attributes: engine ignition (e.g., on or off), engine speed (e.g., RPM and idle time events), vehicle speed (e.g., miles per hour), seat belt status (e.g., engaged or disengaged), vehicle heading (e.g., degrees from center), vehicle backing (e.g., moving in reverse or not moving in reverse), vehicle doors (e.g., open or closed), vehicle handles (e.g., grasped or not grasped by a driver), vehicle location (e.g., latitude and longitude), distance traveled (e.g., miles between two points), use of portable data acquisition device (e.g., in use or not in use), throttle position, brake pedal position, parking brake position, and other measurements (e.g., engine oil pressure, engine temperature, or engine faults). These sensors described above may be configured, for example, to operate in any fashion suitable to generate computer-readable data that may be captured and transmitted by the telematics device 420.

In some embodiments, the telematics device 420 includes one or more of the following components, which are not shown: a processor, a location-determining device or sensor (e.g., GPS sensor), a real-time clock, J-Bus protocol architecture, an electronic control module (ECM), a port for receiving data from the vehicle sensors in one of the logistics vehicles 120, a communication port for receiving instruction data, a radio frequency identification (RFID) tag, a power source, a data radio for communication with a WWAN, a WLAN and/or a WPAN, FLASH, DRAM, and NVRAM memory modules, and a programmable logic controller (PLC). In an alternative embodiment, the RFID tag, the location sensor, and the PLC may be located in the logistisc vehicle 120 external to the telematics device 420. In various embodiments, the telematics device may omit certain of the components described above. It should be understood that the telematics device may include any other suitable components. For example, the telematics device may include other types of communications components than those described above.

According to one embodiment, a processor is configured to capture and store telematics data from one or more vehicle sensors (e.g., GPS sensor, lidar unit 404, radar unit 406-1, etc.) on a logistics vehicle 120 upon the occurrence of one or more defined vehicle events. The processor is configured such that any parameter measurable by the one or more vehicle sensors may be defined as a vehicle event. The processor is also configured to associate telematics data received from one or more vehicle sensors with contextual data indicating, for example: (1) the time the data was captured (e.g., through time-stamping), (2) the vehicle the data was captured from, (3) the driver of the vehicle, (4) a log reason for capturing the data, and/or (5) the route the driver was on at the time the data was collected. In various embodiments, the processor is further configured to transmit the telematics data to the computing entity 110 and/or the one or more analysis computing entities 105. In other embodiments, the processes described herein as being carried out by a single processor may be accomplished by multiple processors.

In one embodiment, the location sensor (not shown), which may be one of several components available in the telematics device 420, may be compatible with a low Earth orbit (LEO) satellite system or a Department of Defense (DOD) satellite system (e.g., via the satellite 112). Alternatively, triangulation may be used in connection with various cellular towers positioned at various locations throughout a geographic area in order to determine the location of the logistics vehicle 120 and/or its driver. The location sensor may be used to receive position, time, and speed data. It will be appreciated by those skilled in the art that more than one location sensor may be utilized, and that other similar techniques may likewise be used to collect geo-location information associated with the logistics vehicle 120 and/or its driver.

In some embodiments, the ECM with J-Bus protocol may be one of several components available in the telematics device 420. The ECM, which may be a scalable and subservient device to the telematics device 420, may have data processor capability to decode and store analog and digital inputs and ECM data streams from vehicle systems and the sensors. The ECM may further have data processing capability to collect and present vehicle data to the J-Bus (which may allow transmittal to the telematics device 420), and output standard vehicle diagnostic codes when received from a vehicle's J-Bus-compatible on-board controllers or vehicle sensors.

In some embodiments, an instruction data receiving port may be one of several components available in the telematics device 420. Embodiments of the instruction data receiving port may include an Infrared Data Association (IrDA) communication port, a data radio, and/or a serial port. The instruction receiving data port may receive instructions for the telematics device 420. These instructions may be specific to the logistics vehicle 120 in which the telematics device 420 is installed, specific to the geographical area in which the logistics vehicle 120 will be traveling, or specific to the function the logistics vehicle 120 serves within the fleet.

In some embodiments, a radio frequency identification (RFID) tag may be one of several components available for use with the telematics device 420. One embodiment of the RFID tag may include an active RFID tag, which comprises at least one of the following: (1) an internal clock; (2) a memory; (3) a microprocessor; and (4) at least one input interface for connecting with sensors located in the logistics vehicle 120 or the telematics device 420. Another embodiment of the RFID tag may be a passive RFID tag. One or more RFID tags may be internal to the telematics device 420, wired to the telematics device 420, and/or proximate to the telematics device 420. Each RFID tag may communicate wirelessly with RFID interrogators within a certain geographical range of each other. RFID interrogators may be located external to the logistics vehicle 120 and/or within the computing entity 110 that can be carried in and out of the logistics vehicle 120 by the vehicle operator.

In some embodiments, vehicle performance and tracking data collected by the telematics device 420 (e.g., telematics data) may be transmitted via a WPAN to, and stored by, the computing entity 110 until a communication link can be established between the computing entity 110 and the analysis computing entity 105, or similar network entity or mainframe computer system. In one embodiment, the computing entity 110 may display telematics data for the driver's viewing, which may be helpful in troubleshooting vehicle performance problems and showing delivery route progress and instructions. In an alternative embodiment, the computing entity 110 may be a hand-held data acquisition device, like an iPAQ. The Media Access Control (MAC) address, which is a code unique to each Bluetooth™-enabled device that identifies the device, similar to an Internet protocol address identifying a computer in communication with the Internet, can be communicated to other devices in communication with the WPAN, which may assist in identifying and allowing communication among vehicles, cargo, and portable data acquisition devices equipped with Bluetooth™ devices.

In some embodiments, the telematics device 420 receives the sensor data from the mapping sensors, such as the lidar units 404, radar sensors 406, and camera 402 in order to provide more accurate predictions for vehicle events or more accuracy for mapping. For example, in some embodiments, the telematics data described above is combined with this mapping data from the sensors to provide additional insights, such as average speed of the logistics vehicle 120. These rich insights can be used for more than typical telematics sensors. For example, with rich mapping data determined from the camera(s) 402 and the lidar units 404, it can be determined exactly when and where drivers took left turns or other maneuvers that either conform to or violate company protocols. These extra insights allow for significantly more monitoring of drivers, vehicles, and the way they react to the environment they are in. All of the information obtained from the telematics device 420 can be output for display on a user interface of the computing entity 110.

FIG. 5A is a schematic diagram of multiple geographic environments that are used for generating a mapping, according to some embodiments. FIG. 5A illustrates the geographical environments 540 and 530. Within these geographical environments, both of the logistics vehicles 500 and 600 (e.g., the logistics vehicle 120) detect and map out their respective environments. A "logistics vehicle" as described herein is any transportation vehicle that is configured to perform one or more shipping operations. For example, a logistics vehicle can be an air-traversing drone, a tractor trailer, a van, delivery shuttle, shifter, line-hauler, and/or an airplane that carries one or more parcels. A "shipping operation" is any activity (either completed or initially engaged in) related to the shipment of one or more parcels. For example, a shipping operation can include the beginning or completion of a delivery and/or pick up one or more parcels (e.g., packages, envelopes, bags, pallets, etc.) to and/or from a destination or pickup point (e.g., a delivery home or business address, shipping locker, geocoordinates (e.g., a specific part of a property) of an area by an address, etc.), also known as final mile delivery. In these embodiments, the traversal of logistics vehicles through a geographical environment typically occurs via one or more delivery routes such that the logistics vehicle traverses multiple different destination or pickup points along the delivery routes. In these embodiments, traversal of logistics vehicles along a route is typically proceeded by a request from a shipper to ship one or more items. For example, a shipper can arrive at a logistics store where the shipper pays for the shipping of a parcel, after which the parcel is loaded onto the logistics vehicle to a sorting center or its destination. Any one of these steps can be a "shipping operation". In another example, a user may be presented with a user interface of a web page or app page that is connected to a logistics network or other third party (e.g., an e-commerce merchant) and where the user can electronically issue a request to ship one or more items. Subsequently, the item can be loaded into the logistics vehicle. Any one of these steps can be a "shipping operation". A shipping operation can alternatively or additionally include delivering packages from a logistics store, locker, or address in a tractor trailer (or other vehicle) to a shipping facility, such as a sorting center. A sorting center is a facility where parcels are culled, labeled, and otherwise organized in preparation for final mile delivery. In some embodiments, a shipping operation can also include pre-activity or post-activity of final mile delivery or other shipping operations. For example, a shipping operation can include the time after which one or more logistics vehicles finish a delivery route or delivering parcels and are one their way back to a facility (e.g., a sorting facility).

The logistics vehicle 500 includes one or more sensors that detect or identifies one or more physical objects in the geographical environment 540 as the logistics vehicle 500 performs a first shipping operation (e.g., carries packages from a shipping store to a sorting facility). As illustrated, the logistics vehicle 500 identifies or detects the building 505, the lines or features in the road 507, the traffic light 509, the fire hydrant 511 and the building 513 as it traverses the roads 503 and 515. The logistics vehicle 600 also includes one or more sensors that detects or identifies one or more physical objects in the geographical environment 530 as the logistics vehicle 600 performs a second shipping operation (e.g., delivers packages to resident addresses as part of a final mile delivery in a shipping route). As illustrated, the logistics vehicle 600 identifies or detects the set of residences 519 and 523, the road sign 517, and the building 513, as it traverses the road 521.

In various embodiments, in response to the detecting or identifying these objects in the geographical environments 530 and 540, a mapping can be generated that includes an image representing the geographical environments 530 and 540. Mappings are described in more detail below with respect to FIG. 6. This mapping can then be used by an autonomous vehicle or partially autonomous vehicle for object detection. A "partially autonomous vehicle" or "semi-autonomous vehicle" as described herein is a vehicle where at least one function is human or operator-controlled in a manual manner and at least one function is autonomous in that it is controlled by the autonomous vehicle without human control or intervention. For example, a partially autonomous vehicle can be a vehicle where the cruise control or regular braking is manually performed by a human but autonomous functions can include emergency breaking or sending notifications about potential hazards that are out of sight of the human eyes in the same vehicle. An "autonomous vehicle" or fully autonomous vehicle is a vehicle where no human control or interaction is required, such as braking, turning, cruise control, etc.

In some embodiments, the logistics vehicles 500 and 600 (or any set of logistics vehicles described herein) form a mesh network of vehicles that communicate sensor data with each other (e.g., in near-real-time). In some embodiments, this data is used to update a mapping that each vehicle already has. A "mesh network" as described herein includes a set of devices (e.g., nodes) that are directly (e.g., no central server) communicatively connected to each other, and if a failure at one device occurs another device could be used in proxy. For example, in some embodiments, the logistics vehicles 500 and 600 may each have a device or node that communicates with each other predictive locations for moving objects. In these embodiments, probabilistic graphical models can be used. In an example illustration, the logistics vehicle 500 can detect an object (e.g., a car, a ball, a person) at particular coordinates or location and/or movement (e.g., velocity) of the object. The logistics vehicle 500 can calculate the probable travel path of the object based on the locations during the movement and responsively broadcast the calculation to the logistics vehicle 600. In this way, the logistics vehicle 600 can be on the "lookout" or be notified of the object. For example, a logistics vehicle can detect (e.g., via an object recognition camera) a pedestrian starting to cross a street. The logistics vehicle can calculate the probable travel path of that object and broadcast the calculated travel path to one or more other logistics vehicles.

The predictions or calculations of objects (e.g., probable travel path of an object) described above can occur via any suitable probabilistic model, such as a Bayesian network, a TAN model, Naïve Bayes classifier, a factor graph, a clique tree, Markov random field, a chain graph, or any other suitable technique. For example, in some embodiments, predictions include using a Bayesian network graph. A Bayesian network graph is a directed acyclic graph that maps the relationships between nodes (e.g., events) in terms of probability. These graphs show how the occurrence of particular events influence the probability of other events occurring. Each node is also conditionally independent of its non-descendants. These graphs follow the underlying principle of Bayes' theorem, represented as:

$$P(A \mid B) = \frac{P(B \mid A)P(A)}{P(B)}, \qquad \text{Equation 1}$$

where A and B are events and P(B) 0. That is, the probability (P) of A given B=the probability of B given A multiplied by the probability of (A) all over the probability of B.

FIG. 5B is a schematic diagram of an autonomous or partially autonomous vehicle that traverses the same geographical environments of FIG. 5A and detects or identified objects based at least in part on the mapping that occurred at FIG. 5A. At a time later than the mapping and detecting of objects as illustrated in FIG. 5A, the autonomous/partially autonomous vehicle 550 may traverse the same geographical environments 530 and 540. Based at least in part on the mapping generated according to the detecting and identifying actions of FIG. 5A, the autonomous/partially autonomous vehicle 550 senses the same objects 505, 507, 509, 511, 513, 517, 523, 519, as it traverses the road 503, 515, and 521. In this way, for example, as soon as or before the autonomous/partially autonomous vehicle 550 traverses down the road 503, the map can be uploaded such that the AV/partial AV 550 already has an indication of the larger geographical environment surrounding it. In this way, there is redundancy in object detection or there is not as much emphasis on real-time or near real-time object detection or identification if, for example, there is bad weather hindering camera's or other sensor's ability to detect objects.

In some embodiments, an autonomous or partially autonomous vehicle is another logistics vehicle that performs one or more shipping operations, except that there is no human driver or little to no required human intervention (even if human drivers are present). For example, the logistics vehicles 500 and 600 may have human operators or are otherwise not autonomous or not partially autonomous. Whereas the AV/partial AV 500 may not have a human operator or is otherwise at least partially autonomous. In other embodiments, the autonomous or partially autonomous vehicle is a third party or vendor vehicle that is unrelated to logistics vehicles, such as consumer cars going about regular day-to-day activity (e.g., taking humans to work).

FIG. 6 illustrates an image of a generated mapping, according to some embodiments. In various embodiments, a "mapping" as referred to herein indicates an image (e.g., digital image) of a real-world geographical environment and includes other metadata (e.g., speed limit of roads or other transportation rules). In some embodiments, the image in FIG. 6 represents a street and immediate environment in one of the geographical environments 530 or 540. As illustrated, various road lines, buildings, trees, buildings, etc. are represented in the image, which is a representation of an actual geographical environment. As described herein, this image can be generated based on the detection of objects via lidar, radar, camera, and/or other sensors as described with respect to FIG. 4. In some embodiments, the image is part of a high definition (HD) map. In some embodiments, the generated mapping has various layers, such as a base map layer (SD map) (bottom or base layer), a geometric map layer, a semantic map layer, a map priors layer, and/or a real-time layer (top-most layer). Each of these layers can be aligned with each other and indexed, which allows for efficient parallel lookups of information both for the current location of the AV and also the local environment. Each layer adds specific data to the overall map.

In various embodiments, the base map layer includes basic road network data (e.g., 2D maps or street view maps), such as maps offered by web map services (e.g., GOOGLE MAPS). In some embodiments, the geometric map layer includes 3-dimensional information of a geographical environment. Raw sensor data obtained from lidar, radar, and/or other sensors is processed using particular algorithms (e.g., simultaneous localization and mapping "SLAM" techniques) to first build a 3D view of the geographical environment. The output of these algorithms are a 3D point cloud and particular trajectory that the mapping vehicle (e.g., logistics vehicle 500) took. The output can additionally or alternatively include data that is post-processed to produce map objects (e.g., mountains, streets, hills, outline of street lights, etc.) that are stored in the geometric map. For example, these objects can include voxelized (a unit of graphical data that represents a point in three-dimensional space) geometric maps and ground maps. The ground maps are used to models of the ground in sections. The ground map can be used to align the other layers of the map, such as the semantic map.

The semantic map layer adds semantic objects (e.g., lane boundaries, parking areas, crosswalks, traffic signs, lights, etc.) to the geometric map layer. These objects can contain corresponding metadata, such as speed limits, turn restrictions (e.g., U-turn is prohibited), or any other transportation rules associated with the specific features of the mapped geographic area. Although a 3D point cloud as indicated in the geometric map layer may include all of the pixels and/or voxels that represent an object, such as a traffic light, the semantic map layer is the layer that stores all of the other information (e.g., metadata, such as speed limit of a road) about particular objects. In some embodiments, human operators can validate or fix any information contained in the semantic layer for consistency and accuracy. In some embodiments, the semantic layer can use the ground map generated by the geometric layer to identify z-positions of lane areas. The geometric and semantic map layers capture the static physical objects of a geographical environment. The maps prior layer and real-time layers conversely captures the dynamic and behavioral aspects of the geographical environment.

The map prior layer includes dynamic information and human driving behavior. This can include both semantic and geometric information. For example, information such as the order in which traffic lights at a particular intersection cycle through their various states (e.g., red, green, protected-left, yellow, read, etc.) and the amount of time spent in each state are encoded in the map priors layer. This layer can also include the time/timestamp and day of week that the mappings occurred. Data in this layer can be used by prediction systems. For example, areas of street lanes with metadata can capture the probability of encountering a parked vehicle at the particular area. In this way, at runtime when an AV encounters a stationary vehicle in the map region indicating a high probability that a car is parked (as opposed to being in a traffic jam) in the area, the AV may route itself around the vehicle. Further, knowledge of where cars are regularly parked allows AVs to be more cautious to car doors opening, pedestrians, etc. The real-time layer is configured to be updated in real/near-real time. This layer includes real-time traffic information, such as current speed of vehicle(s), traffic congestion, current pedestrians, new construction zones, etc. In various embodiments, alignment algorithms are employed to connect all of the layers as an entire mapping.

IV. Exemplary System Operation

FIG. 7 is a screenshot 700 of a user interface indicating notification options and which geographical environments have been mapped, according to some embodiments. In some embodiments, the screenshot 700 is provided by a logistics entity, such as by the analysis computing entity 105 (e.g., over the network(s) 135 to the computing entity 110). In particular embodiments, the screenshot 700 is provided to any suitable entity, such as one or more of the computing entities 110, the autonomous vehicle 160, and/or the logistics vehicle 120. The screenshot 700 can be accessed or provided in any suitable manner. For example, in some embodiments, a user can open a client application, such as a web browser, and input a particular Uniform Resource Locator (URL) corresponding to a particular website or portal. In response to receiving the user's URL request, an entity, such as the one or more analysis computing entities 105 may provide or cause to be displayed to a user device (e.g., a computing entity 110), the screenshot 700. A "portal" as described herein in some embodiments includes a feature to prompt authentication and/or authorization information (e.g., a username and/or passphrase) such that only particular users (e.g., a corporate group entity) are allowed access to information. A portal can also include user member settings and/or permissions and interactive functionality with other user members of the portal, such as instant chat. In some embodiments a portal is not necessary to provide the user interface, but rather any of the views can be provided via a public website such that no login is required (e.g., authentication and/or authorization information) and anyone can view the information. In yet other embodiments, the screenshot 700 represents an aspect of a locally stored application, such that a computing device hosts the entire application and consequently the computing device does not have to communicate with other devices (e.g., the analysis computing entity 105) to retrieve data.

The user interface feature 701 indicates each of the geographical environments or locations that have been mapped. As illustrated, these environments can be defined by any suitable geographic descriptor, such as a geofence, city, geocoordinates, zip code, neighborhood, apartment complex, state, etc. A geofence, as described herein is a processor-defined (e.g., via a user request) logical boundary that encompasses one or more geographical areas or digital images that represent geographical areas, such as certain streets, zip code, neighborhood, etc. In an example illustration, the mapped locations can include each of the geographical environments 530 and 540.

The user interface feature 703 indicates each of the unmapped geographical environments or locations. In some embodiments, the logistics entity may include a database of each route or geographical environment driven by each logistics vehicle (e.g., over 100 vehicles). For example, a data structure stored in memory may be a lookup table or hash structure that maps each particular logistics vehicle with a given geographical descriptor (e.g., geofence, city, zip code, etc.). These logistics vehicles may be assigned to traverse these corresponding geographical environments of the geographical descriptors. In response to a logistics vehicle mapping a particular geographical environment (e.g., a neighborhood in a delivery route), the logistics vehicle may transmit, over a network, a notification indicating that the geographical environment is now mapped. Accordingly, the system (e.g., analysis computing entity 105) may populate the data structure and the screenshot 700 (via the feature 701) indicating that the area has been mapped. However, if the data structure does not indicate that a particular area has been mapped, the data under the feature 703 may be provided to indicate that the particular area has not been mapped. This may happen for various reasons, such as the logistics vehicle not yet traversing a location in its delivery route even though it is included in a route schedule or assignment. In some embodiments, the unmapped locations are not necessarily tied to the work or route schedules of particular logistics operations but are any area that has not been mapped regardless of whether shipment operations have been assigned to these areas.

Per the feature 705, the screenshot 700 may receive a user selection, thereby causing a notification to be sent to logistics vehicles, AV/partially AV vehicles, and/or other computing devices. This notification may indicate the mapped and/or unmapped locations according to the information in the features 701 and/or 703. For example, in response to the logistics vehicle 120 engaging in a delivery route to deliver multiple parcels to multiple addresses with a particular geographical environment, the system (e.g., the analysis computing entity 105) may cause the information indicated in the features 701 and/or 703 to be provided to the logistics vehicle 120 and/or device associated with the driver of logistics vehicle 120, such as a DIAD or mobile phone. In this way, the driver has information concerning whether or not his/her route has been mapped. In some embodiments, the driver's route is modified based at least in part on receiving this mapping information. For example, in response to receiving the mapped information contained in the screenshot 700 and that a particular driver will traverse close (e.g., within a threshold distance) of a geographical environment that has not been mapped before, the system (e.g., the analysis computing entity 105) can cause the logistics vehicle to change its course by sending a notification to the driver's device, which prompts the driver to drive the new route in order for the unmapped geographical environment to now become mapped.

In another example, the driver may receive an indication that while a geographical environment has been mapped before, it has been a long time (e.g., outside of a time threshold) since the geographical environment has been mapped. This indicates that mapping may be old and need of an update. Accordingly, the driver can traverse the area and cause sensors to map the geographical environment. In yet another example, if metadata indicated that a particular geographical environment had just been mapped (e.g., within a threshold time period, such as a couple hours ago), a control signal may automatically be transmitted, over a computer network, to the logistics vehicle, causing the mapping sensors (e.g., lidar, radar, etc.) to not function in order to preserve wear on the sensors and because the geographical environment was recently mapped anyway. Alternative to the automated control signal, a notification can be transmitted to the driver's device indicating that the driver should shut off the mapping sensors since it has just been mapped.

Per the feature 707, another notification (e.g., indicating the information in the features 701 and/or 703) can alternatively or additionally be transmitted to deployed autonomous/partially autonomous vehicles or associated devices. In this way, deployed AVs/partial AVs (e.g., the AV540 of FIG. 5B) can receive information indicating which geographical environments have been mapped. In some embodiments, these notifications are provided in real-time or at a time substantially close to the mappings of specific geographical environments being completed. This information can cause deployed AVs to modify a route. For example, in response to receiving information as indicated in the features 701 and 703, an autonomous vehicle may modify its route that was scheduled to go through geofence XT345 (unmapped) to geofence 56279 (mapped) as long as they are within a threshold distance (e.g., 2 square miles) of each other.

FIG. 8 is a flow diagram of an example process 800 for generating a mapping, according to embodiments. The process 800 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer program product/apparatus as described herein may perform or be caused to perform the process 800, and/or any other functionality described herein.

Per block 802, an indication that one or more physical objects have been detected in one or more geographical environments as (or in response to) one or more logistics vehicles performing one or more shipping operations is received (e.g., by the analysis computing entity 105 and/or the logistics vehicle 120 over a computer network) (e.g., in near-real-time relative to the detection by sensor(s)). In some embodiments, this is proceeded by a first sensor (e.g., a lidar sensor) that detects a first set of one or more physical objects in a first geographical environment (e.g., the geographical environment 530) as (or in response to) (or in near-real time relative to) a first logistics vehicle performs a first shipping operation. The first sensor is coupled (e.g., attached) to the first logistics vehicle. In some embodiments, a second sensor detects a second set of one or more physical objects in a second geographical environment (e.g., the geographical environment 540) as (or in response to) (or in near-real-time relative to) a second logistics vehicle (e.g., the logistics vehicle 600) performs a second shipping operation. The second sensor is coupled to the second logistics vehicle. In some embodiments, the first shipping operation and the second shipping operation include delivering one or more parcels to destination addresses or drop off points within the first geographical area and the second geographical area. However, it is understood that these shipping operations can be any suitable shipping operation as described herein, such as delivering parcels to a sorting facility.

In some embodiments, the logistics vehicles are delivery vehicles that have drivers (e.g., human drivers). The delivery vehicles are configured to unload parcels at final destinations or drop off points in response to a request to ship the parcels (e.g., within a shipping store or at a UI) to the final destinations or drop off points. Alternatively or additionally, the logistics vehicles are delivery drones that are configured to travel in air space (e.g., in the sky above the ground) to unload a parcel at a final destination or drop off point in response to a request to ship the parcel to the final destination or drop off point. Delivery drones may be desirable for mapping because they may map more objects or objects at different views compared to logistics vehicles that traverse roads in a single plane. In this way, better and more data rich maps can be provided to AVs/partial AVs for object detection, which improves technology. For example, delivery drones can map a geographical environment from a top view (for example lidar, radar, and camera sensors can be oriented at the bottom of the delivery drone to map out what is underneath the delivery drone). This is in contrast to vehicles that traverse a street at ground level and can only map a geographical environment from a side view or view that is planar to the ground.

In some embodiments, in addition to performing block 802, one or more other sensors may detect, via a telematics device (e.g., as described in FIG. 4) coupled to the logistics vehicle, telematics data indicating one or more vehicle events of the logistics vehicle. Based on the analyzing of the telematics data and the detecting of the set of one or more physical objects (described with respect to block 802), an estimate associated with the one or more vehicle events can be generated. For example, based on analyzing telematics data indicating one or more vehicle events indicative of a speed of the logistics vehicle and analyzing data from the one or more sensors (e.g., lidar, radar, camera, etc.), an average speed estimate of the logistics vehicle can be generated. Alternatively, the difference between the speed readings of these sensors can be calculated. Additionally or alternatively, one or more mapping data, such as one or more transportation rules (e.g., a particular street has a particular MPH) as obtained by the sensors can be compared to telematics data indicating the actual speed of the vehicle to generate an estimate. Accordingly, if the telematics data violates any of the transportation rules, a notification can be transmitted to computing devices (e.g., a logistics manager device) indicating that a particular driver has violated one or more transportation rules.

Per block 804, a mapping of the one or more geographical environments can be caused to be generated (e.g., by the logistics vehicle 120 and/or the analysis computing entity 105). Based at least in part on the detecting (e.g., by sensor(s) of the logistics vehicle 120) of the first set of one or more physical objects (and/or the second set of one or more physical objects) (e.g., as performed at block 802), a mapping that includes an image representing the first geographical environment (and/or the second geographical environment) is generated. Alternatively or additionally, based at least in part on receiving (e.g., by the analysis computing entity 105) an indication that the one or more physical objects have been detected (via sensors), a mapping of the geographical environment(s) can be caused to be generated. A "mapping" can include an image representation (e.g., the image of FIG. 6) of the geographical environment(s) and/or metadata (e.g., transportation rules or other metadata included in any mapping layer as described with respect to FIG. 6) associated with the geographical environment(s). For example, the mapping can include a HD map that includes a real-time layer, a map priors layer, a semantic map layer, a geometric map layer, and a base map layer. In another example, the mapping can include the image as described with respect to FIG. 6.

In some embodiments, a third sensor can detect the same physical object(s) and additional objects in the same geographical environments as another logistics vehicle performs another shipping operation. The third sensors is coupled to the another logistics vehicle. Based at least in part on the detecting of the additional objects in the second geographical environment, the mapping can be updated to include the additional objects in the image and/or metadata. For example, referring back to FIG. 5A, the logistics vehicle 500 can map the geographical environment 540 at a first time. At a second time subsequent to the first time, another logistics vehicle (not shown) can traverse the same geographical environment 540. This logistics vehicle can detect the same objects (e.g., 505, 509, 511, etc.) and additional objects (e.g., newly built traffic signs not existent within the geographical environment 540 at the first time) in order to update a mapping to include these additional objects.

In some embodiments, multiple logistics vehicles can keep traversing new geographical environments in order to update the mapping. For example, a third sensor can detect a third set of one or more physical objects in a third geographical environment as a third logistics vehicle performs a third shipping operation. The third sensor is coupled to the third logistics vehicle. The generating of the mapping is further based on the detecting of the third set of one or more physical objects in the third geographical environment. In an illustrative example, referring back to FIG. 5A, in addition to the geographical environments 540 and 530 being mapped by the logistics vehicles 500 and 600 respectively, another logistics vehicle (not shown) can traverse another nearby (e.g., within a threshold physical distance) geographical environment, such that the new geographical environment is added to the already existing map. Accordingly, the geographical environments 540 and 530 can be linked to the new geographical environment.

Per block 806, the mapping generated at block 804 is stored (e.g., by the logistics vehicle 120, AV 160, and/or analysis computing entity 105) for use by an autonomous vehicle or partially autonomous vehicle. The mapping can be stored to a data store (e.g., a database coupled to the analysis computing entity 105). The stored mapping can be for use by an AV/partial AV as it traverses the geographical environment(s) described with respect to block 802. The AV/partial AV can use the stored maps for detecting objects in the geographical environment(s) described with respect to block 802. For example, referring back to FIG. 5B, the AV/partial AV 550 can traverse the same geographical environments of FIG. 5A and detect the same objects using the generated map (and/or detect different real-time objects).

In an illustrative example of AV/partial AV operations, a system (e.g., the analysis computing entity 105, AV 160, and/or the logistics vehicle 120) can obtain, via a third sensor, an indication that the physical object(s) and additional objects in the geographical environment(s) has been detected as a particular autonomous/partially autonomous vehicle is traversing the geographical environment(s). The third sensor is coupled to the particular autonomous vehicle. Responsively, the information associated with the stored mapping is compared (e.g., by the AV 160) with information associated with the additional objects (e.g., additional real-time sensor data, such as current pedestrians, light changes, bike riders, etc.). Based at least in part on the comparing, the particular autonomous vehicle can be caused to perform an action (e.g., stop based on a traffic light change indicated in the real-time data but not the map). For example, the AV 160 can detect that it is in a current geographical environment and upload its map generated at block 804. It can detect various static objects (e.g., street signs, street lights, buildings, etc.) based on reading the map and reading the same static objects in real-time with various sensors (e.g., lidar, radar, camera, GPS, etc.). Additionally, it can detect new real-time objects not included in the maps, such as current pedestrians, current traffic signals, and particular cars that represent the current traffic. It can then determine that these new real-time objects are not included in the map but are still necessary to perform one or more actions, such as stopping, turning, swerving, going faster, etc.

The following clauses represent exemplary aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are exemplary in nature and are not limiting.

Clause 1. A cooling garment comprising.

DEFINITIONS

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "data store" as described herein is any type of repository for storing and/or managing data, whether the data is structured, unstructured, or semi-structured. For example, a data store can be or include one or more: databases, files (e.g., of unstructured data), corpuses, digital documents, etc.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first request), second (e.g., second request), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, the analysis computing entity 105 may "cause" a message to be displayed to a computing entity 110 (e.g., via transmitting a message to the user device) and/or the same computing entity 110 may "cause" the same message to be displayed (e.g., via a processor that executes instructions and data in a display memory of the user device). Accordingly, one or both systems may in isolation or together "cause" the effect of displaying a message.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

V. Conclusion

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodi-

What is claimed is:

1. A computer-implemented method comprising:
detecting, at a first time via a first sensor, a first set of one or more physical objects in a first geographical environment as a first logistics vehicle drives on a first road and performs a first shipping operation, the first sensor is coupled to the first logistics vehicle, the first logistics vehicle being one of: a first car, a first truck, a first van, or a first tractor trailer;
generating, based at least in part on detecting the first set of one or more physical objects, a first probability, wherein the first probability represents a first property of at least one of the first set of one or more physical objects or a first similar physical object to the first set of one or more physical objects that can be encountered while traversing the first road;
generating a High Definition (HD) mapping, wherein the HD mapping includes a first layer that includes a first image representing the first geographical environment and a second layer that includes the first probability;
detecting, at a second time subsequent to the first time and via a second sensor, a second set of one or more physical objects in a second geographical environment as a second logistics vehicle drives on a second road and performs a second shipping operation, the second sensor is coupled to the second logistics vehicle, the second logistics vehicle being one of: a second car, a second truck, a second van, or a second tractor trailer;
generating, based at least in part on detecting the second set of one or more physical objects, a second probability, wherein the second probability represents a second property of at least one of the second set of one or more physical objects or a second similar physical object to the second set of one or more physical objects that can be encountered while traversing the second road;
updating at least the first layer of the HD mapping to include a second image representing the second geographical environment such that the first layer includes the first image and the second image and updating the second layer of the HD mapping to include the second probability such that the second layer includes the first probability and the second probability; and
transmitting the HD mapping, wherein transmitting the HD mapping causes an autonomous vehicle or a partially autonomous vehicle to upload the HD mapping before driving on the first road or the second road and use the HD mapping and a third sensor to detect at least one of the first set of one or more physical objects or the first similar physical object in the first geographical environment and at least one of the second set of one or more physical objects or the second similar physical object in the second geographical environment as the autonomous vehicle or the partially autonomous vehicle drives on the first road and on the second road, the autonomous vehicle and the partially autonomous vehicle being a consumer vehicle unrelated to the first logistics vehicle and the second logistics vehicle.

2. The method of claim 1, further comprising:
detecting, via a fourth sensor coupled to a second vehicle traversing the second road, an additional object in the second geographical environment as a third logistics vehicle performs a third shipping operation, the fourth sensor is coupled to the third logistics vehicle;
based at least in part on detecting the additional object in the second geographical environment, updating at least the first layer of the HD mapping to include a third image of the additional object; and
storing the HD mapping to a data store.

3. The method of claim 1, wherein the first layer and the second layer comprise at least one of a real-time layer, a map priors layer, a semantic map layer, a geometric map layer, or a base map layer.

4. The method of claim 1, wherein the first shipping operation and the second shipping operation include delivering one or more parcels to destination addresses or drop off points within the first geographical environment and the second geographical environment.

5. The method of claim 1, wherein the at least one of the first set of one or more physical objects or the first similar physical object comprises a second vehicle, the first property comprises a parked state of the second vehicle, and the autonomous vehicle or the partially autonomous vehicle routes around the second vehicle based on use of the HD mapping and the third sensor to detect at least one of the first set of one or more physical objects or the first similar physical object in the first geographical environment.

6. The method of claim 1, wherein the at least one of the first set of one or more physical objects or the first similar physical object comprises a traffic light, the first property comprises an amount of time in a current state of the traffic light, and the autonomous vehicle or the partially autonomous vehicle adjusts a speed of the autonomous vehicle or the partially autonomous vehicle based on use of the HD mapping and the third sensor to detect at least one of the first set of one or more physical objects or the first similar physical object in the first geographical environment.

7. A system comprising:
at least one computing device having at least one processor; and
at least one computer readable storage medium having program instructions embodied therewith, the program instructions readable or executable by the at least one processor to cause the system to:
in response to a logistics vehicle performing one or more shipping operations in a geographical environment as the logistics vehicle traverses on a road, receive, via one or more sensors coupled to the logistics vehicle, an indication of a physical object that has been detected, at a first time, in the geographical environment;
generate, based at least in part on the indication of the physical object that has been detected, a probability, wherein the probability represents a property of at least one of the physical object or a similar physical object to the physical object that can be encountered while traversing the road;
generate a mapping of the geographical environment, wherein the mapping comprises a first layer that includes a first image representing the geographical environment and a second layer of metadata that includes the probability; and
based on generating the mapping, transmit the mapping to an autonomous vehicle or a partially autonomous vehicle for uploading, wherein transmitting the mapping causes the autonomous vehicle or the partially autonomous vehicle to detect the physical object or the similar physical object while in the geographical environment as the autonomous vehicle or the partially autonomous vehicle traverses the road.

8. The system of claim 7, wherein the at least one processor further causes the system to:
obtain, via another sensor coupled to a second logistics vehicle traversing the road, a second indication that a second physical object has been detected in the geographical environment;
based at least in part on the second indication, update the mapping to include the second physical object; and
store the mapping.

9. The system of claim 7, wherein the at least one processor further causes the system to:
obtain, via another sensor coupled to a second logistics vehicle traversing the road, a second indication that another physical object has been detected in the geographical environment;
wherein generating the mapping is further based on obtaining the second indication that the another physical object has been detected in the geographical environment.

10. The system of claim 9, wherein the logistics vehicle and the second logistics vehicle are delivery vehicles that have drivers, and the delivery vehicles are configured to unload parcels at final destinations or drop off points within the geographical environment.

11. The system of claim 7, wherein the first layer comprises at least one of a real-time layer, a map priors layer, a semantic map layer, a geometric map layer, or a base map layer.

12. The system of claim 7, wherein the physical object or the similar physical object comprises a second vehicle, the property comprises a parked state of the second vehicle, and the autonomous vehicle or the partially autonomous vehicle routes around the second vehicle based on use of the mapping to detect the physical object or the similar physical object while in the geographical environment.

13. The system of claim 7, wherein the physical object or the similar physical object comprises a traffic light, the property comprises an amount of time in a current state of the traffic light, and the autonomous vehicle or the partially autonomous vehicle adjusts a speed of the autonomous vehicle or the partially autonomous vehicle based on use of the mapping to detect the physical object or the similar physical object while in the geographical environment.

14. An apparatus comprising a computer readable storage medium having program instructions embodied therewith, the program instructions executable by one or more processors to cause the one or more processors to:
in response to a logistics vehicle performing one or more shipping operations in a geographical environment, receive, via a sensor coupled to the logistics vehicle traversing a road in the geographical environment during a first time, an indication that a physical object has been detected in the geographical environment;
generate, based at least in part on the indication that the physical object has been detected, a probability, wherein the probability represents a property of at least one of the physical object or a similar physical object to the physical object that can be encountered while traversing the road;
cause a mapping of the geographical environment to be generated, the mapping including an image representation of the geographical environment and metadata comprising the probability;
store the mapping; and
in response to receiving a request for the mapping, transmit the mapping for uploading to an autonomous vehicle or a partially autonomous vehicle, wherein uploading the mapping causes the autonomous vehicle or the partially autonomous vehicle to detect, during a second time subsequent to the first time while traversing the road, the physical object or the similar physical object in the geographical environment.

15. The apparatus of claim 14, wherein the one or more processors are further caused to:
obtain, via another sensor coupled to a second logistics vehicle traversing the road, a second indication that an additional object has been detected in the geographical environment;
based at least in part on the second indication, update the mapping to include the additional object; and
store the mapping.

16. The apparatus of claim 14, wherein the one or more processors are further caused to:
obtain, via another sensor coupled to a second logistics vehicle traversing the road, a second indication that a second physical object has been detected in the geographical environment;
wherein generating the mapping is further based on obtaining the second indication that the second physical object has been detected in the geographical environment.

17. The apparatus of claim 14, wherein the logistics vehicle is a delivery drone that is configured to travel in air space to unload a parcel at a final destination or a drop off point within the geographical environment in response to a request to ship the parcel to the final destination or the drop off point.

18. The apparatus of claim 14, wherein the physical object or the similar physical object comprises a second vehicle, the property comprises a parked state of the second vehicle, and the autonomous vehicle or the partially autonomous vehicle routes around the second vehicle based on use of the mapping to detect the physical object or the similar physical object during the second time subsequent to the first time while traversing the road.

19. The apparatus of claim 14, wherein the physical object or the similar physical object comprises a traffic light, the property comprises an amount of time in a current state of the traffic light, and the autonomous vehicle or the partially autonomous vehicle adjusts a speed of the autonomous vehicle or the partially autonomous vehicle based on use of the mapping to detect the physical object or the similar physical object during the second time subsequent to the first time while traversing the road.

* * * * *